US012731142B2

(12) United States Patent
Falese et al.

(10) Patent No.: US 12,731,142 B2
(45) Date of Patent: Sep. 8, 2026

(54) COMMERCIAL BENEFICIARY PROFILES FOR TRANSACTIONS

(71) Applicant: Wells Fargo Bank, N.A., San Francisco, CA (US)

(72) Inventors: Sean Edward Falese, Jenkintown, PA (US); Nathanial David Sanders, Papillion, NE (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/741,142

(22) Filed: Jun. 12, 2024

(65) Prior Publication Data

US 2025/0384440 A1 Dec. 18, 2025

(51) Int. Cl.
*G06Q 20/40* (2012.01)
*G06Q 20/36* (2012.01)

(52) U.S. Cl.
CPC ......... *G06Q 20/401* (2013.01); *G06Q 20/363* (2013.01)

(58) Field of Classification Search
None
See application file for complete search history.

(56) References Cited

U.S. PATENT DOCUMENTS

| | | | | |
|---|---|---|---|---|
| 10,635,471 | B2 * | 4/2020 | Davis | G06Q 40/08 |
| 2013/0246202 | A1 * | 9/2013 | Tobin | G06Q 20/326 705/18 |
| 2017/0004518 | A1 * | 1/2017 | Moreau, Jr. | G06Q 30/0204 |
| 2019/0213346 | A1 * | 7/2019 | Friedman | G06F 21/6218 |
| 2019/0311337 | A1 * | 10/2019 | Madisetti | G06Q 20/3823 |
| 2019/0356641 | A1 * | 11/2019 | Isaacson | G06Q 20/065 |
| 2020/0028668 | A1 * | 1/2020 | Ramasamy | G06N 3/02 |
| 2020/0219150 | A1 * | 7/2020 | Johnston | G06Q 30/0282 |
| 2020/0356803 | A1 * | 11/2020 | Yang | G06Q 30/0251 |
| 2021/0049596 | A1 * | 2/2021 | Guo | H04L 9/50 |
| 2021/0357924 | A1 * | 11/2021 | Twing | H04L 9/3239 |
| 2024/0005318 | A1 * | 1/2024 | Dolezal | G06Q 20/401 |
| 2024/0152881 | A1 * | 5/2024 | Yu | G06Q 20/14 |
| 2025/0190969 | A1 * | 6/2025 | Lynch | G06Q 20/42 |
| 2025/0293884 | A1 * | 9/2025 | Gilchrist | G06Q 20/3825 |

OTHER PUBLICATIONS

M. Hussain and D. B. Skillicorn, "The case for service provider anonymity," The 10th IEEE International Symposium on Signal Processing and Information Technology, Luxor, Egypt, 2010, pp. 114-119, doi: 10.1109/ISSPIT.2010.5711743. (Year: 2010).*

(Continued)

*Primary Examiner* — Eduardo Castilho
(74) *Attorney, Agent, or Firm* — Merchant & Gould P.C.

(57) ABSTRACT

An example computer system for facilitating transactions using commercial profiles can include: one or more processors; and non-transitory computer-readable storage media encoding instructions which, when executed by the one or more processors, causes the computer system to: create a commercial profile for a first party to a transaction; cryptographically secure the commercial profile; allow the commercial profile to be selected by a second party to initiate the transaction; facilitate the transaction between the first party and the second party using information in the commercial profile of the first party.

18 Claims, 5 Drawing Sheets

(56) References Cited

OTHER PUBLICATIONS

J. Trevathan, H. Ghodosi and W. Read, "An Anonymous and Secure Continuous Double Auction Scheme," Proceedings of the 39th Annual Hawaii International Conference on System Sciences (HICSS'06), Kauai, HI, USA, 2006, pp. 125b-125b, doi: 10.1109/HICSS.2006.45. (Year: 2006).*

Hussain, Mohammed. "The design and applications of a privacy-preserving identity and trust-management system," Queen's University (Year: 2010).*

* cited by examiner

400

COMMERCIAL BENEFICIARY PROFILES FOR TRANSACTIONS

BACKGROUND

Transactions between two commercial parties can be insecure and inefficient. Currently, one of the commercial parties must share transactional details with the other commercial party to consummate the transaction. For instance, one commercial party provides an account number or other identifying information to allow for payment between the commercial parties. This causes friction and insecurity in such transactions.

SUMMARY

Examples provided herein are directed to commercial beneficiary profiles for transactions.

According to one aspect, an example computer system for facilitating transactions using commercial profiles can include: one or more processors; and non-transitory computer-readable storage media encoding instructions which, when executed by the one or more processors, causes the computer system to: create a commercial profile for a first party to a transaction; cryptographically secure the commercial profile; allow the commercial profile to be selected by a second party to initiate the transaction; facilitate the transaction between the first party and the second party using information in the commercial profile of the first party.

According to another aspect, an example method for facilitating transactions using commercial profiles can include: creating a commercial profile for a first party to a transaction; cryptographically securing the commercial profile; allowing the commercial profile to be selected by a second party to initiate the transaction; facilitating the transaction between the first party and the second party using information in the commercial profile of the first party.

The details of one or more techniques are set forth in the accompanying drawings and the description below. Other features, objects, and advantages of these techniques will be apparent from the description, drawings, and claims.

DETAILED DESCRIPTION

This disclosure relates to commercial beneficiary profiles for transactions.

More specifically, the examples described herein provide for a more efficient way for parties to consummate transactions. For instance, this disclosure is directed at providing an easier way for commercial parties to conduct transactions.

In one embodiment, the communications between the commercial parties that facilitate the transactions are compliant with a standard protocol that allows for secure messaging. A middle party, such as a financial institution, uses the standard protocol to facilitate the transactions through profiles that are created for each of the commercial parties. Further, third parties can access an application programming interface (API) to facilitate transactions with third parties outside of the system.

There can be various advantages associated with the technologies described herein. For instance, the technology described herein more securely facilitates transactions between commercial parties, resulting in the practical application of a more efficient transactional network. Various other advantages, such as greater ease in making payments and identifying beneficiaries, are also provided.

Figure 1:
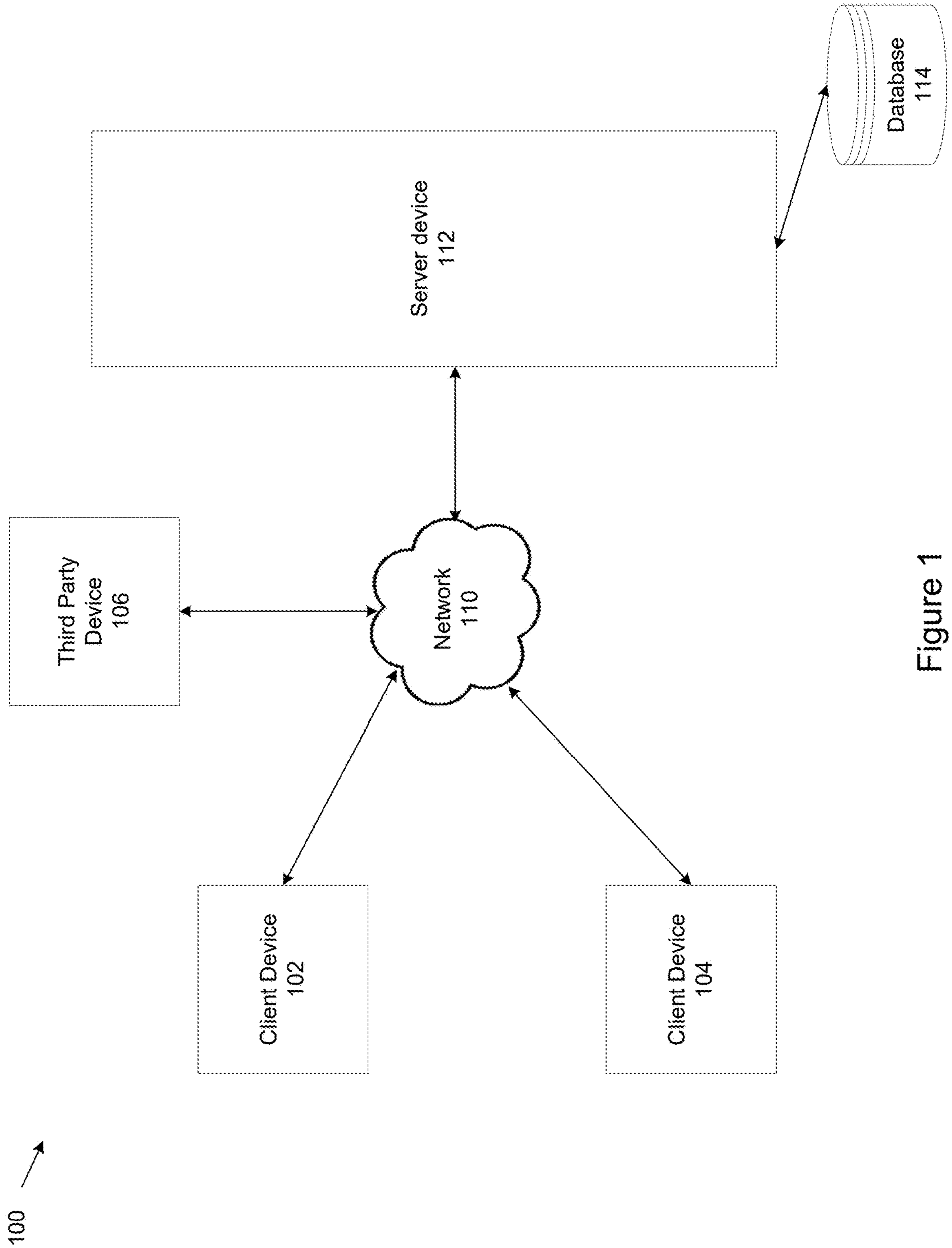
FIG. 1 shows an example system for providing commercial beneficiary profiles for transactions.

FIG. 1 schematically shows aspects of one example system 100 programmed to provide commercial beneficiary profiles for transactions. In this example, the system 100 can be a computing environment that includes a plurality of client and server devices. In this instance, the system 100 includes client devices 102, 104, a third party device 106, a server device 112, and a database 114. The client devices 102, 104 and the third party device 106 can communicate with the server device 112 through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The client devices 102, 104 and the third party device 106 can be programmed to communicate with the server device 112 to provide the commercial beneficiary profiles for transactions. Many other configurations are possible.

The example client device 102 is associated with a company (e.g., Company A) and is programmed to communicate transaction details to the server device 112. In this example, the client device 102 can be a commercial payor who initiates and/or receives a transaction to pay another commercial party, such as the client device 104.

The example client device 104 is associated with a company (e.g., Company B) and is programmed to is programmed to communicate transaction details to the server device 112. In this example, the client device 104 can be a commercial payee who initiates and/or receives a transaction to receive payment from another commercial party, such as the client device 102.

Both the client devices 102, 104 can be customers of the financial institution associated with the server device 112. In this scenario, the transaction between the client devices 102, 104 is an on-us transaction that is handled within the system 100.

The example third party device 106 is programmed to communicate transaction details to the server device 112. In this example, the third party device 106 can be a commercial payor or payee who initiates and/or receives a transaction to pay or receive payment from another commercial party, such as one of the client device 102, 104. In such a scenario, the third party device 106 can communicate with an API provided by the server device 112 to consummate the transaction, which is an off-us transaction that is handled at least partially outside the system 100.

The example server device 112 is programmed to facilitate the noted transactions. As provided in more detail below, the server device 112 can be an identity provider that functions to provide secure communications between the devices 102, 104, and/or 106 to facilitate the transactions. Additional details on the server device 112 are provided below in reference to FIGS. 2-5.

The example database 114 is programmed to store details associated with the transactions. For instance, the database 114 can be programmed to store profiles for the devices 102, 104, and/or 106 that facilitate the transactions within the system 100.

The network 110 provides a wired and/or wireless connection between the devices 102, 104, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
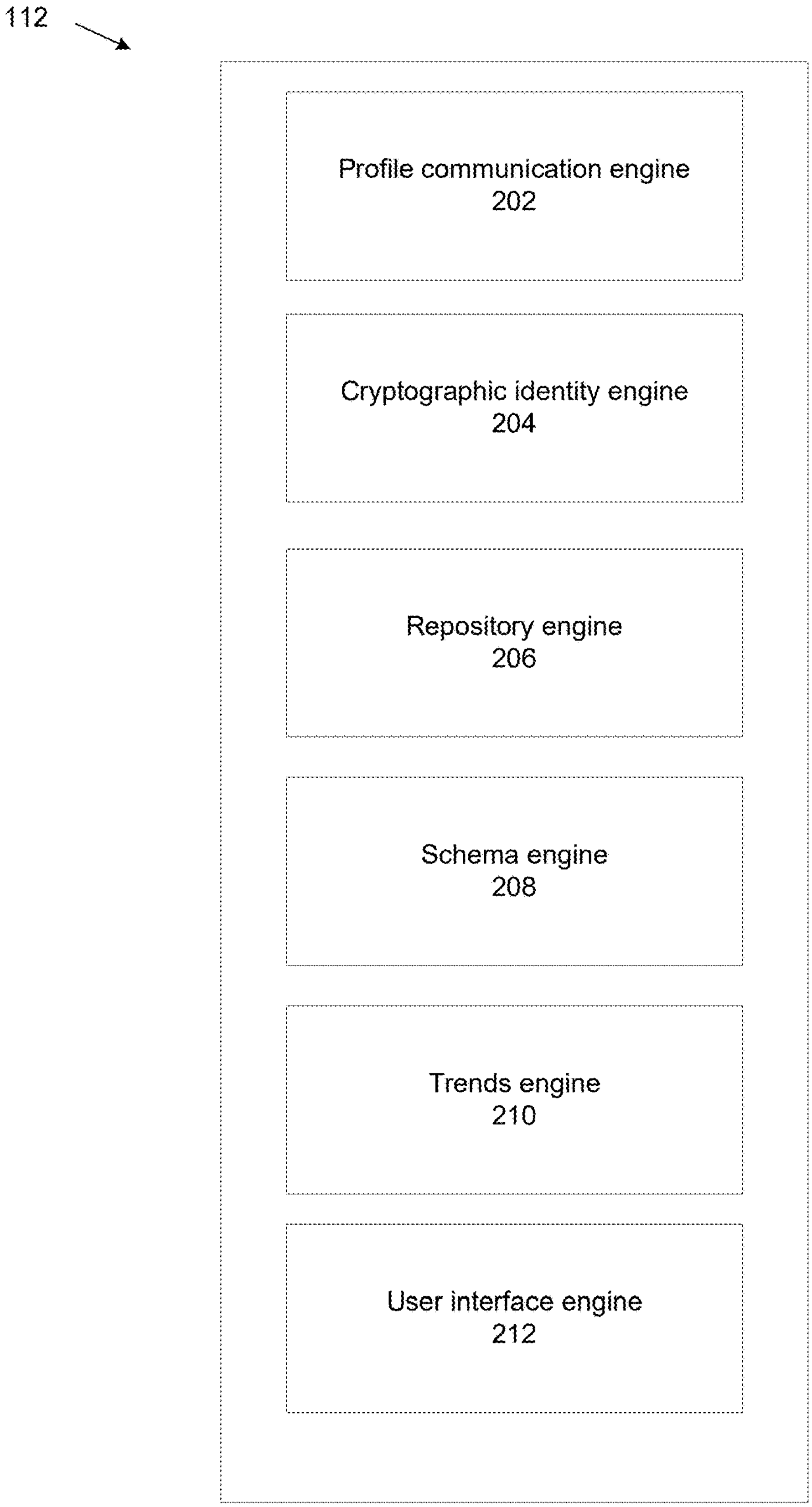
FIG. 2 shows example logical components of a server device of the system of FIG. 1.

Referring now to FIG. 2, additional details of the server device 112 are shown. In this example, the server device 112 has various logical modules that assist in providing the commercial beneficiary profiles for transactions. The server device 112 can, in this instance, include a profile communication engine 202, a cryptographic identity engine 204, a repository engine 206, a schema engine 208, a trends engine 210, and a user interface engine 212. In other examples, more or fewer engines providing different functionality can be used.

The example profile communication engine 202 is programmed to facilitate the communication of profiles throughout the system 100. In this example, the profile communication engine 202 utilizes a standard specification, such as a World Wide Web Consortium (W3C) Decentralized Identifiers (DIDs) specification that allowed for secure, cryptographically signed communications over protocols like Remote Procedure Call (RPC) or Hypertext Transfer Protocol Secure (HTTPS).

In this embodiment, the profile communication engine 202 facilitates the transfer of the profiles between the client devices 102, 104, the third party device 106 (via an external API), and the server device 112, and the server device 112 functions as a centralized identity authority. The profiles themselves are owned by the customers (e.g., devices 102, 104, 106), making the data portable between systems. The server device 112 facilitates the transactions.

The server device 112 further functions to provide for the automatic reconciliation of the transactions. This can include, without limitation, onboarding with Know Your Customer (KYC) considerations, account validation, and payment order and execution.

To accomplish these functions, the server device 112 can adopt a social networking paradigm for facilitating high confidence payments across the system 100 and/or industry payment rails. Specifically, in one example, the profile communication engine 202 uses a social graph, such as The AT Protocol provided by BlueSky, PBC, which leverages technology to power the social networking aspects of the system 100, thereby allowing the functionality described herein. Other configurations are possible.

By creating and managing cryptographic identity tokens according to the W3C standard for decentralized identity along with a signed repository for all payable and receivable transaction activity a social graph between transaction parties can be created and leveraged for enhanced payee validation, automated payment processing and scheduling, and more informed cash flow analysis through instant receivable reconciliation.

Such a configuration combines those methods with a powerful cryptographic decentralized identity, a signed repository for invoices and remittances and an interoperability layer to allow for direct party to party integration. By combining the identity and potential payment profiles for inbound or outbound transactions dynamic execution of payments can be instantly configured and optimized for various parameters like time to funds availability, transaction cost, currency considerations like exchange rate conversions, or invoice discounts, due dates, or settlement timings. Additionally the bene network provides new avenues for collaboration between business entities. Potential use cases could be shared documentation for contracting, sales proposals, or other transactional relationships requiring enhanced identity validation.

The bene network also opens new opportunities for self-service and account opening. An 'invite' process or similar function to join the network would allow non-customers, such as the third party device 106, to progressively validate and leverage the mechanisms to increase confidence in transactions with customers.

The example cryptographic identity engine 204 is programmed to secure the profiles used for the transactions. Cryptographic identification can be provided by the cryptographic identity engine 204 at the domain level, and each transaction can use a key/token.

More specifically, the cryptographic identity engine 204 can generate keys for identity for each party, and the keys can be used for signing transactions. The cryptographic identity engine 204 further generates and associates a key with a centralized identity validation process as conducted by the server device 112.

An example process can be as follows.

(i) Company A (e.g., associated with the client device 102) signs up for the system 100.

(ii) Company A is registered as a qualified domain @companyA.system.com through progressive identity and account validation by the cryptographic identity engine 204.

(iii) The cryptographic identity engine 204 establishes a key authority for @companyA.system.com that is a fork of the @system.com authority for the system 100.

(iv) All transactions made at the system by other customers (e.g., associated with the devices 104, 106) can now cryptographically validate the selection of the @companyA.system.com for a transaction (e.g., making a payment).

The example repository engine 206 is programmed to store and reconcile the data for the system 100, such as in the database 114. In examples herein, the repository engine 206 stores various account information for the parties, including both receivable and payable information in a cryptographically-signed format to preserve security.

The repository engine 206 can also be programmed to align receivables with payables, thereby facilitating automatic reconciliation. Further, the repository engine 206 stores various payment types for sending and receiving payments associated with each profile. For instance, the payor can select payment type based upon profile information for beneficiary. Further, the repository engine 206 can store invoices and remittances for later access by the parties.

The repository engine 206 can use the identity keys generated by the cryptographic identity engine 204 to commit a record to the repository. Further, the repository engine 206 can facilitate the API used by the parties outside the system 100 (e.g., the third party device 106) to describe the data schema (see the schema engine 208 below) for the repository. Finally, the repository engine 206 can be programmed to integrate with a company's Enterprise Resource Planning (ERP) system to automatically populate transactional information stored by the repository engine 206.

An example process can be as follows.

- (i) Company A (e.g., client device 102) has created an invoice in Company A's ERP system for services rendered to company B.
- (ii) Company A's ERP system generates a request for an entry in the Company A payment profile repository managed by the repository engine 206 via an API for the system 100.
- (iii) A commit for Invoice 1234 has been created in the @companyA.system.com payment profile repository by the repository engine 206 and is signed with User1@companyA.system.com key.
- (iv) This commit is available at @companyA.system-.com/invoice/1234 through the repository engine 206.
- (v) Company B receives the invoice notification from Company A.
- (vi) Company B generates a payment transaction based on the signed commit available at @companyA.system-.com/invoice/1234 through the repository engine 206.
- (vii) Company B schedules payment execution based upon cash flow needs with the ID of ABCD.
- (viii) A commit for payment ABCD has been created in the @companyB.system.com payment profile as managed by the repository engine 206 and signed with User2@companyB.system.com key.
- (ix) This commit is available at @companyB.system.com/remittance/ABCD through the repository engine 206.

The repository engine 206 is also programmed to manage and store the profiles associated with each of the parties for the system 100. Consistent with the examples above, the Company A can create a single "Beneficiary Profile" in the repository engine 206 that can be shared across the entire system 100 or in relation to specific account/user entitlements. The repository engine 206 allows the profile for each party to define various payment types (e.g., ACH, wires, instant payments), as well as span across multiple products for the system 100. The profile can also define different actions and types of business for each profile, such as beneficiary, supplier, etc.

Figure 3:
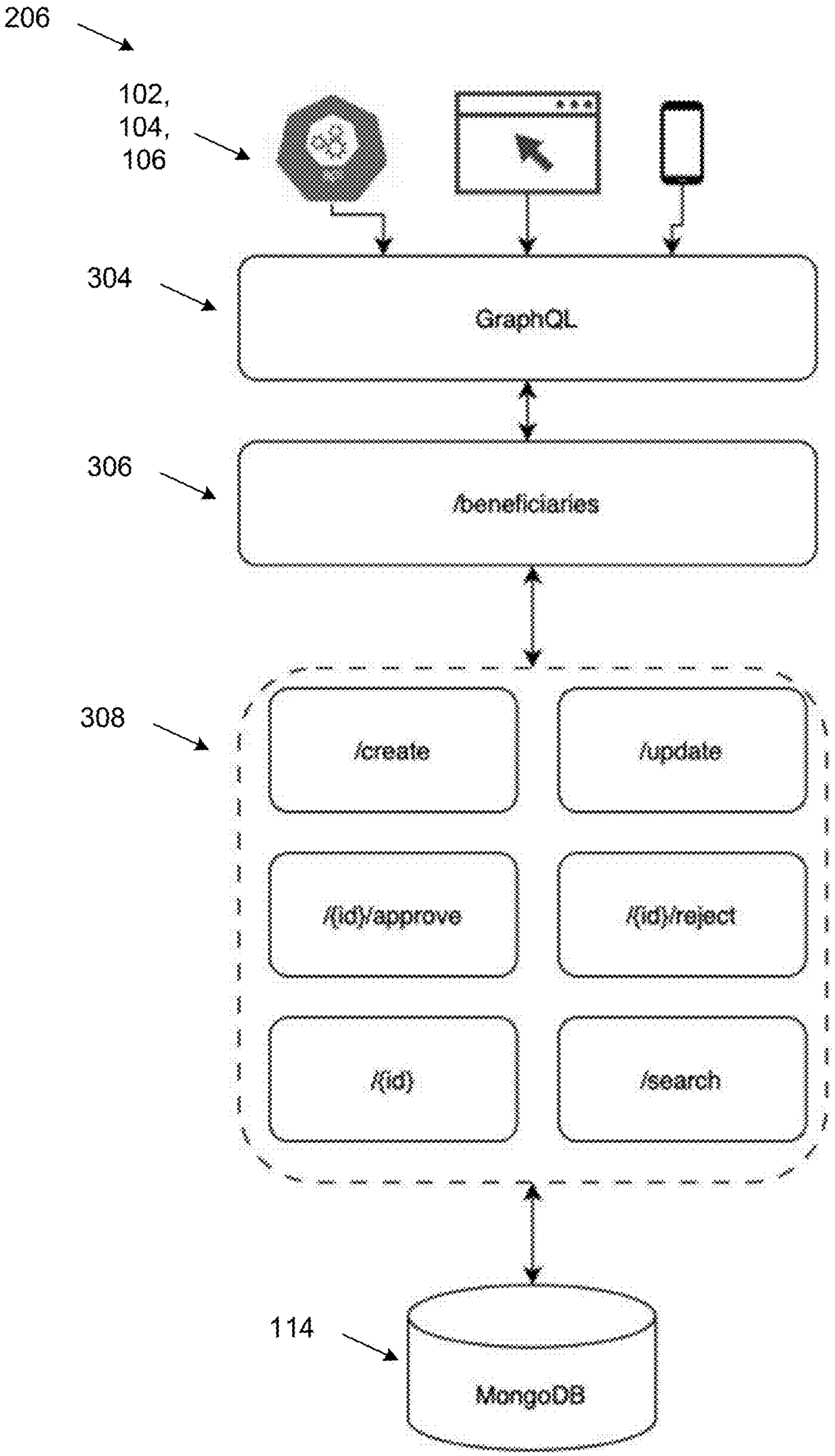
FIG. 3 shows an example logical components of a repository engine generated by the server device of FIG. 2.

Referring now to FIG. 3, additional details on the repository engine 206 are shown for a given transaction. In this example, the repository engine 206 receives input from one of more of the devices 102, 104, 106. A query 304, such as a GraphQL open-source data query, is generated by the repository engine 206 to access the relevant data. For instance, relevant beneficiary profiles 306 can be accessed by the repository engine 206, and various actions 308 can be performed on the profile data. Such actions include, without limitation, the following.

- /create—Create a beneficiary profile with one or more payment types.
- /update—Update an existing beneficiary profile, such as by providing additional routing/account number and/or payment type information.
- /{id}/approve—Company approve being added to another company's transaction profile.
- /{id}/reject—Company reject being added to another company's transaction profile.
- /{id}—Identify a profile.
- /search—Search for a set of profiles.

The beneficiary profile data is stored in the database 114, such as a MongoDB document-oriented database from MongoDB Inc. Many other configurations are possible.

In one instance, a beneficiary object is defined by the repository engine 206 for the storage of each profile. An example of a JSON beneficiary object follows.

```
"beneficiary": {
  "name": "Acme Company",
  "accounts": [
    {
      "accountName": "ACH and Wires",
      "accountMethods": [
        "ACH",
        "WIRE"
  ],
  "accountCurrency": "USD",
  "accountNumber": "9812489156789",
  "bankRoutingNumber": "10000481588169879000O",
  "bankName": "BOA",
  "comment": "string",
  "tags": [
    "Electronic POs",
    "Tech"
    ],
  {
]
"phoneNumbers": [
  }
    [{"name": "Front Desk",
  "areaCode": "408",
  "number": "5162412",
  "comment": "string"],
[,
"addresses":
  street1": "111 Main Street",
  "street2": "Apartment 2",
  "city": "string",
  "state": "AL",
  "postalCode": "string"
    }
    ]
  }
}
```

Various additional functionality can be provided by the repository engine 206, including one or more of the following.

- (i) The ability for a party to create a profile, then send that profile to the beneficiary (email/text), where the beneficiary could review and confirm the information.
- (ii) The ability for a party to create their own profile containing the beneficiary information, then the party could "share" their profile with other organizations.
- (iii) The ability for a party to send an email/text to a beneficiary, wherein the party could fill out the information for their profile directly.
- (vi) The ability of a party to manage profiles associated with subsidiaries of the party.

Referring again to FIG. 2, the example schema engine 208 is programmed to define a centralized data schema ("lexicon") to be used by the system 100. This schema can be centralized, normalized, and interoperable across networks. In these examples, the schema defined by the schema engine 208 facilitates the connections between parties within the system 100 to conduct transactions.

An example process can be as follows.

- (i) Upon validation of the commit in the @companyB-.system.com/payment profile by the repository engine 206, a message is sent to the schema engine 208.

(ii) The schema for the @companyB.system.com/remittance is translated and normalized by the schema engine 208.

(iii) A message is sent to the @companyA.system.com/profile with the normalized remittance@companyB.system.com/remittance/ABCD for @companyA.system.com/invoice/1234.

(vi) A new commit has been created in the @companyA-.system.com profile by the repository engine 206 with invoice and remittance linked.

The example trends engine 210 is programmed to provide for large-scale trend analysis based upon transaction details, profiles and other typical social networking patterns across the system 100. An interconnected social graph of suppliers and consumers can be created and traversed to identify macro-economic trends, create detailed economic or supplier pricing analysis for sale to customers.

In this manner, the trends engine 210 can provide more details about the transactions that are facilitated by the system 100. For instance, the trends engine 210 can segregate the data based upon industry, payment type, or other metrics specific to a party. This can, in some instance, allow a party to better understand how other parties within an industry are performing. Many configurations are possible.

The example user interface engine 212 is programmed to facilitate transactions within the system 100. For instance, the user interface engine 212 can allow a party to create and collect beneficiary profile information and share such information with other parties.

Figure 4:
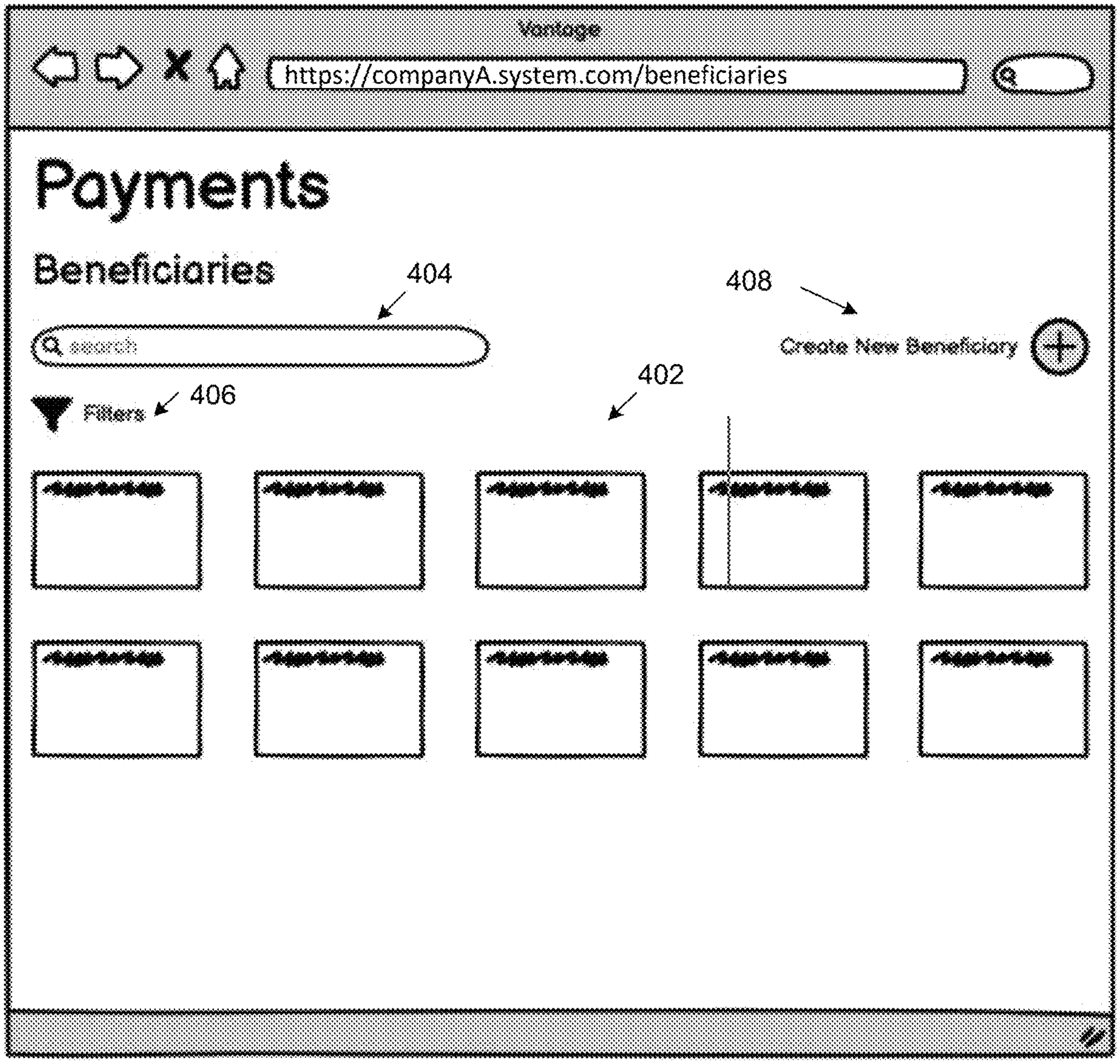
FIG. 4 shows an example user interface generated of a user interface engine generated by the server device of FIG. 2.

For example, referring now to FIG. 4, an example user interface 400 is shown as generated by the user interface engine 212.

In this user interface 400, various beneficiary profiles 402 associated with the Company A are shown. Each of the beneficiary profiles 402 may define the types of payment accepts (e.g., ACH, wires, virtual cards, etc.). Each of the beneficiary profiles 402 can also provide other details about the beneficiary, such as the beneficiary name (e.g., Company B), the type, and/or account details. Other information can also be shared, as controlled by the beneficiaries who owns each of the beneficiary profiles 402.

The example user interface 400 can receive selection of one of the beneficiary profiles to allow for a transaction to occur. Upon selection, the transaction with the selected beneficiary profile can proceed as described above.

The example user interface 400 allows for various ways to search and filter the beneficiary profiles 402. This can be helpful, for instance, when the Company A has many beneficiary profiles listed on the user interface 400. A control 404 allows for searching of one or more of the beneficiary profiles 402 according to keywords, such as company name, etc. A control 406 allows for filtering of the beneficiary profiles 402, such as by industry, etc.

Finally, a control 408 allows for creation of a new beneficiary profile. In this instance, Company A can identify a new beneficiary profile, such as by company name, to be added to the beneficiary profiles 402 listed on the user interface 400. When doing so, Company A can verify that the proper beneficiary profile has been selected using various aspects, such as an email address or phone number. A company, such as Company B, would receive a communication to verify the requested information so that the beneficiary profile associated with the Company B can be added to the beneficiary profiles 402 on the user interface 400. Many configurations are possible.

Figure 5:
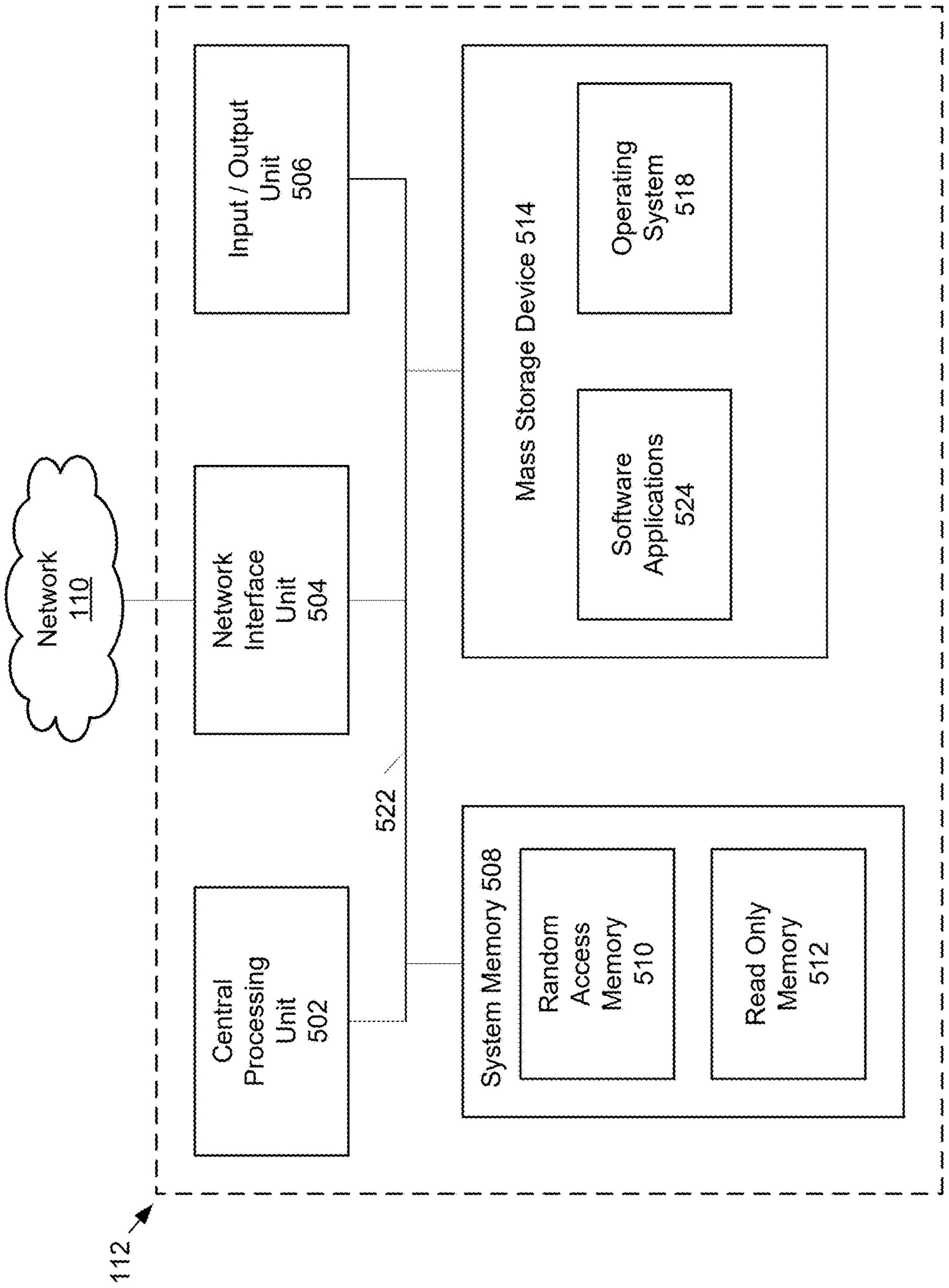
FIG. 5 shows example physical components of the server device of FIG. 2.

As illustrated in the embodiment of FIG. 5, the example server device 112, which provides the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server device 112, such as during startup, is stored in the ROM 512. The server device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 504 connected to the system bus 522. It should be appreciated that the network interface unit 504 may also be utilized to connect to other types of networks and remote computing systems. The server device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server device 112 can store software instructions and data. The software instructions include an operating system 518 suitable for controlling the operation of the server device 112. The mass storage device 514 and/or the RAM 510 also store software instructions and applications 524, that when executed by the CPU 502, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for facilitating transactions using commercial profiles, comprising:

one or more processors; and non-transitory computer-readable storage media encoding instructions which, when executed by the one or more processors, causes the computer system to:

create a commercial profile for a first party to a transaction, wherein the commercial profile is configured according to a schema, wherein the schema includes decentralized identifiers allowing for cryptographically signed communications;

define, according to the schema, multiple payment types configured to process transactions through distinct account methods and routing protocols;

define, according to the schema, different business action types configured to specify party roles for transaction processing;

cryptographically secure the commercial profile using the decentralized identifiers;

allow the commercial profile to be selected by a second party to initiate the transaction;

normalize data in the commercial profile from the first party according to the schema to form a normalized data format;

automatically select, by the computer system, payment processing parameters based on the multiple payment types and the different business action types to optimize financial and temporal aspects of payment execution; and facilitate, according to the payment processing parameters, the payment execution of the transaction between the first party and the second party using information in the commercial profile of the first party in the normalized data format.

2. The computer system of claim 1, wherein the commercial profile includes a name and a payment type for the first party.

3. The computer system of claim 1, comprising further instructions which, when executed by the one or more processors, causes the computer system to receive selection of the commercial profile by the second party through an application programming interface.

4. The computer system of claim 1, comprising further instructions which, when executed by the one or more processors, causes the computer system to assign a cryptographic identity token to the commercial profile.

5. The computer system of claim 1, comprising further instructions which, when executed by the one or more processors, causes the computer system to automatically reconcile the transaction between the first party and the second party.

6. The computer system of claim 1, comprising further instructions which, when executed by the one or more processors, causes the computer system to use identity keys associated with the commercial profile to commit a record to a repository.

7. The computer system of claim 1, comprising further instructions which, when executed by the one or more processors, causes the computer system to generate a trend based upon a metric associated with the commercial profile.

8. The computer system of claim 7, wherein the metric is one of an industry type and a payment type.

9. The computer system of claim 1, comprising further instructions which, when executed by the one or more processors, causes the computer system to:

generate a user interface including a plurality of commercial profiles including the commercial profile of the first party; and allow the second party to select the commercial profile of the first party from the plurality of commercial profiles on the user interface.

10. A method for facilitating transactions using commercial profiles, comprising:

creating a commercial profile for a first party to a transaction, wherein the commercial profile is configured according to a schema, wherein the schema includes decentralized identifiers allowing for cryptographically signed communications;

defining, according to the schema, multiple payment types configured to process transactions through distinct account methods and routing protocols;

defining, according to the schema, different business action types configured to specify party roles for transaction processing;

cryptographically securing the commercial profile using the decentralized identifiers;

allowing the commercial profile to be selected by a second party to initiate the transaction;

normalizing data in the commercial profile from the first party according to the schema to form a normalized data format;

automatically selecting, by a computer system, payment processing parameters based on the multiple payment types and the different business action types to optimize financial and temporal aspects of payment execution; and facilitating, according to the payment processing parameters, the payment execution of the transaction between the first party and the second party using information in the commercial profile of the first party in the normalized data format.

11. The method of claim 10, wherein the commercial profile includes a name and a payment type for the first party.

12. The method of claim 10, further comprising receiving selection of the commercial profile by the second party through an application programming interface.

13. The method of claim 10, further comprising assigning a cryptographic identity token to the commercial profile.

14. The method of claim 10, further comprising automatically reconciling the transaction between the first party and the second party.

15. The method of claim 10, further comprising using identity keys associated with the commercial profile to commit a record to a repository.

16. The method of claim 10, further comprising generating a trend based upon a metric associated with the commercial profile.

17. The method of claim 10, further comprising:

generating a user interface including a plurality of commercial profiles including the commercial profile of the first party; and allowing the second party to select the commercial profile of the first party from the plurality of commercial profiles on the user interface.

18. A computer system for facilitating transactions using commercial profiles, comprising:

one or more processors; and non-transitory computer-readable storage media encoding instructions which, when executed by the one or more processors, causes the computer system to:

create a commercial profile for a first party to a transaction, wherein the commercial profile includes a name and a payment type for the first party, and wherein the commercial profile is configured according to a schema that is centralized, normalized, and interoperable across the computer system, and wherein the schema includes decentralized identifiers allowing for cryptographically signed communications;

define, according to the schema, multiple payment types configured to process transactions through distinct account methods and routing protocols;

define, according to the schema, different business action types configured to specify party roles for transaction processing;

cryptographically secure the commercial profile using the decentralized identifiers;

assign a cryptographic identity token to the commercial profile;

use identity keys associated with the commercial profile to commit a record to a repository;

allow the commercial profile to be selected by a second party to initiate the transaction;

normalize data in the commercial profile from the first party according to the schema to form a normalized data format;

automatically select, by the computer system, payment processing parameters based on the multiple payment types and the different business action types to optimize financial and temporal aspects of payment execution;

facilitate, according to the payment processing parameters, the payment execution of the transaction between the first party and the second party using information in the commercial profile of the first party in the normalized data format;

automatically reconcile the transaction between the first party and the second party; and generate a trend based upon a metric associated with the commercial profile, wherein the metric is one of an industry type and the payment type.

* * * * *